(12) United States Patent
Funayama

(10) Patent No.: US 11,561,761 B2
(45) Date of Patent: Jan. 24, 2023

(54) INFORMATION PROCESSING SYSTEM, METHOD, AND STORAGE MEDIUM

(71) Applicant: CANON KABUSHIKI KAISHA, Tokyo (JP)

(72) Inventor: Hirotaka Funayama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/938,784

(22) Filed: Jul. 24, 2020

(65) Prior Publication Data

US 2021/0034324 A1 Feb. 4, 2021

(30) Foreign Application Priority Data

Jul. 31, 2019 (JP) .............................. JP2019-140813

(51) Int. Cl.
  *G06F 3/16* (2006.01)
(52) U.S. Cl.
  CPC .................................. *G06F 3/167* (2013.01)
(58) Field of Classification Search
  CPC .................................. G06F 3/16; G06F 3/167
  USPC ......................................................... 715/727
  See application file for complete search history.

(56) References Cited

U.S. PATENT DOCUMENTS

| | | | | |
|---|---|---|---|---|
| 5,790,426 A | * | 8/1998 | Robinson | G06Q 10/025 702/179 |
| 9,195,703 B1 | * | 11/2015 | Kirmse | G06F 16/24 |
| 2002/0049717 A1 | * | 4/2002 | Routtenberg | H04H 60/23 |
| 2012/0166377 A1 | * | 6/2012 | Sathish | G06Q 10/00 706/47 |
| 2014/0108019 A1 | * | 4/2014 | Ehsani | G06F 40/242 704/275 |
| 2014/0279817 A1 | * | 9/2014 | Whitman | G06F 16/637 706/52 |
| 2015/0288998 A1 | * | 10/2015 | Kocks | H04N 21/4826 725/14 |
| 2015/0325136 A1 | * | 11/2015 | Sedayao | G09B 19/00 434/236 |
| 2016/0227291 A1 | * | 8/2016 | Shaw | H04N 21/4826 |
| 2016/0255401 A1 | * | 9/2016 | Hayton | H04N 21/44218 725/12 |
| 2019/0246936 A1 | * | 8/2019 | Garten | A61B 5/316 |

FOREIGN PATENT DOCUMENTS

| | | | | |
|---|---|---|---|---|
| CN | 105426381 A | * | 3/2016 | ......... G06F 17/2705 |
| JP | 2008-282098 A | | 11/2008 | |
| JP | 2016194614 A | * | 11/2016 | |

* cited by examiner

*Primary Examiner* — Stephen S Hong
*Assistant Examiner* — Broderick C Anderson
(74) *Attorney, Agent, or Firm* — Canon U.S.A., Inc. IP Division

(57) ABSTRACT

A voice assistant is provided whereby, in response to receipt of a voice instruction for requesting a recommended piece of content from a user, the voice assistant receives, from a system, a response including information on a recommended piece of content determined using another playback history having a feature similar to a feature of playback histories stored in association with a user ID of the user, and outputs the piece of content.

11 Claims, 10 Drawing Sheets

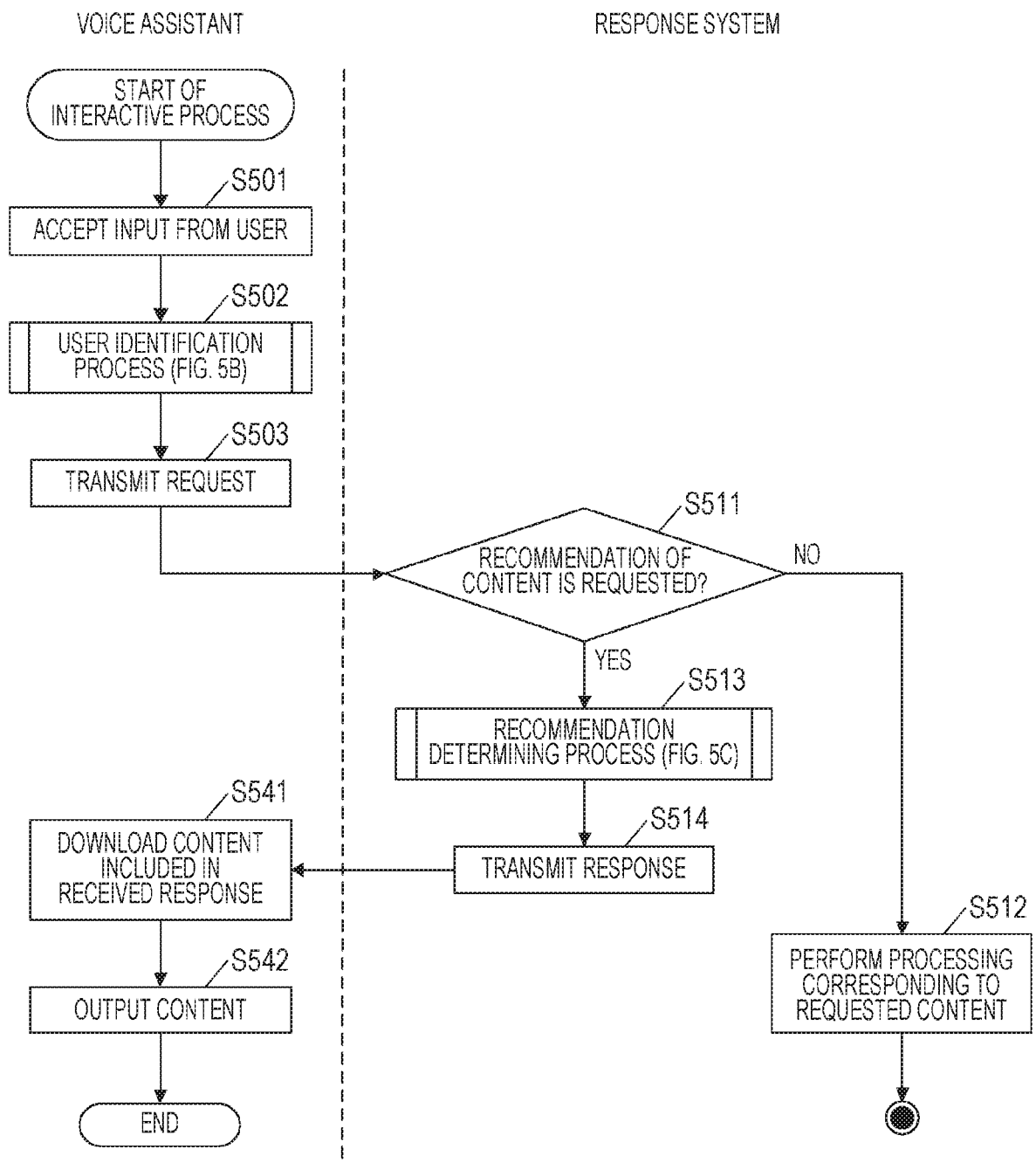

INFORMATION PROCESSING SYSTEM, METHOD, AND STORAGE MEDIUM

BACKGROUND

Field

The present disclosure relates to a system that recommends an optimum result for a user input on a device such as a voice assistant used by many unspecified people.

Description of the Related Art

In recent years, there has been a move to actively use so-called big data. For example, according to Japanese Patent Application Laid-Open No. 2008-282098, when a server of an online shopping site receives a user request, the server performs hybrid recommendation processing for determining a recommended commodity by determining an order of priority on the basis of correlations between commodities (cross-selling property of commodities), correlations between an individual and commodities (preference of the individual), and information on hot-selling commodities.

In addition, machine learning technologies such as deep learning are attracting attention, and the development of artificial intelligence (hereinafter, abbreviated as AI) using collected big data and machine learning technologies is actively conducted.

As a device that connects the AI and people to each other, a device having a function of a speaker (hereinafter, referred to as a voice assistant) such as a smart speaker or a smart display is commonly used. The voice assistant is an information device having a function of interpreting an utterance of a user using a voice recognition function and of executing various instructions given by the user. Since the voice assistant is able to receive a voice instruction, the voice assistant beneficially saves labor of a key operation or a touch input performed on an existing personal computer or smartphone.

An example of scenario in which the voice assistant is used is as follows. The voice assistant is installed in the living room of the house. A user can play desired music or place an order of a commodity using an online shopping service provided via the Internet, by giving a. voice instruction to the voice assistant. Vehicles equipped with a function equivalent to the voice assistant are also sold.

There is AI that is personalized for each user and changes the response for each user. For example, such AI recommends a piece of content that matches the preference of the user on the basis of histories such as video viewing and browsing histories, music listening and browsing histories, and commodity purchase and browsing histories. There are also a voice assistant equipped with such AI and a voice assistant having an input/output function for the AI. Specifically, AI recommends a piece of content by using a model created through learning based on a history of inputs to the voice assistant and feedback to the voice assistant.

It is also assumed that the voice assistant is used not only by a specific person or at a specific place but also at any place where many unspecified users are present. For example, in the living room of the common home, the voice assistant may be used by various users such as parents, children, and visitors. Therefore, if the above-described AI is assumed, the created model is a model in which preferences of respective users coexist. Consequently, the AI may fail to present an appropriate recommendation for a user who desires to use the voice assistant personally, in addition, optimization of the recommendation may be desired depending on an environment in which the voice assistant is used and depending on the circumstance which the user is in.

SUMMARY OF THE INVENTION

An embodiment of the present disclosure provides an information processing system comprising, an audio processing device including a microphone configured to accept an input of voice and a response system is configured to manage information about a plurality of pieces of content and manage, for each user, playback history information about the plurality of pieces of content in association with identification information of a user, wherein the audio processing device includes an extracting unit configured to extract a feature quantity from the accepted input including voice to specify identification information of a user corresponding to the extracted feature quantity, and a requesting unit configured to transmit a request for a piece of content to the response system; and wherein the response system includes, a determining unit configured to determine, in a case where the request is received from the audio processing device, a piece of content to be provided to the user identified by the identification information specified by the extracted feature quantity, using another playback history information having a feature that is similar to a feature obtained from playback history information that is managed in association with the identification information specified by the extracted feature quantity, and a response unit configured to transmit a response including information on the determined piece of content to the audio processing device, wherein. the audio processing device further includes an output unit configured to output the piece of content, based on the information on the piece of content included in the response received from the response system.

An embodiment of the present disclosure enables even a voice assistant that may be shared among a plurality of users to present a recommended piece of content in consideration of the personal preference.

Further features of the present disclosure will become apparent from the following description of exemplary embodiments with reference to the attached drawings.

BRIEF DESCRIPTION OF THE DRAWINGS

FIGS. 5A, 5B, and 5C are flowcharts describing a process performed when a request for a recommended piece of content is input to the voice assistant according to the first embodiment.

DESCRIPTION OF THE EMBODIMENTS

Embodiments of the present disclosure will be described below with reference to the drawings.

First Embodiment

Figure 1:
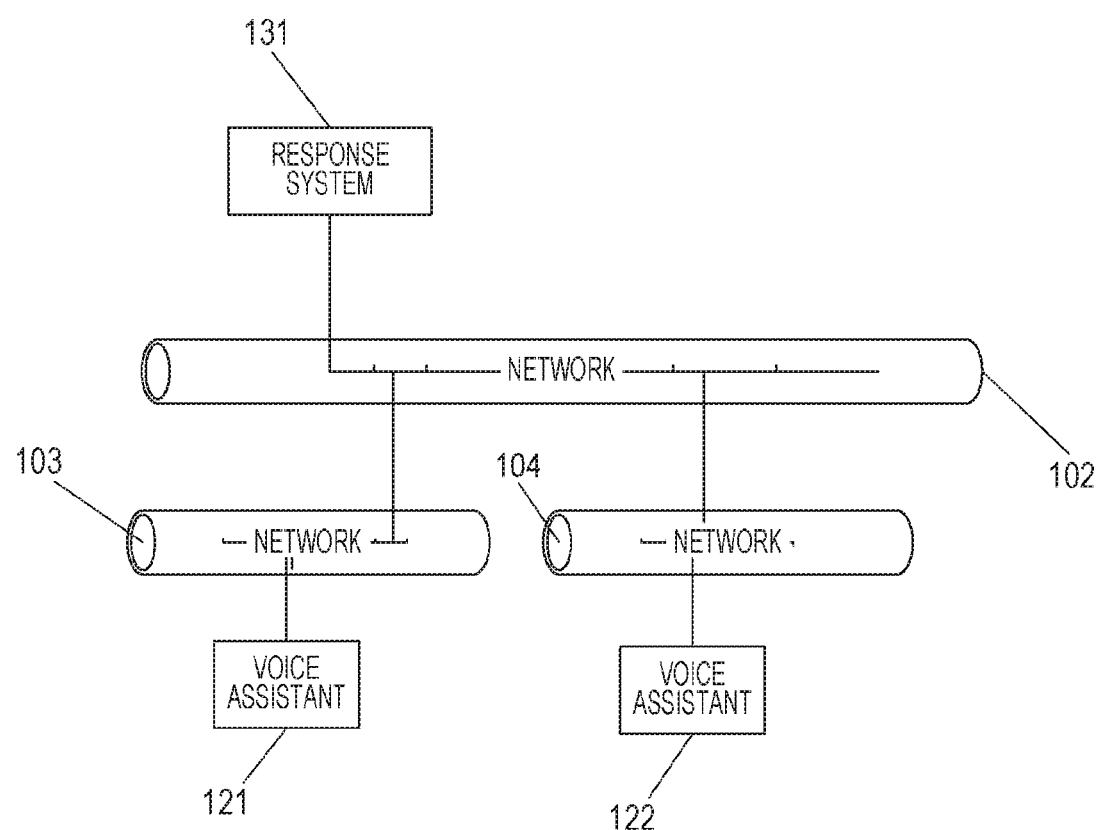
FIG. 1 illustrates an example of an overall configuration of an information processing system according to a first embodiment.

FIG. 1 is a diagram illustrating an example of an overall configuration of an information processing system according to the first embodiment.

In FIG. 1 a response system 131 and voice assistants 121 and 12.2 are connected to one another via networks 102 to 104. The networks 102 to 104 are so-called communication networks implemented by, for example, a local area network (LAN), a wide area network (WAN), a mobile network, a dedicated digital network, an ATM or frame relay network, a cable television network, a data broadcasting wireless network, or the like. The networks 102 to 104 are at least capable of transmitting and receiving data. Herein, the network 102 is the Internet, and the networks 103 and 104 are networks such as company intranets or home networks. The connection may be made with a cable or wirelessly, Each of the voice assistants 121 and 122 accepts a sound signal as a voice input from a user. Each of the voice assistants 121 and 122 then performs voice recognition using the input signal, transmits the resultant audio signal to the response system 131 via the networks 102 to 104, interprets a response returned from the response system 131, and outputs the response as sound, a video image, or the like. A voice assistant is an audio processing device capable of accepting a voice input and of outputting a response, and is, for example, a smart speaker, a smart display, a tablet, a smartphone, a drone, a robot, or an image processing device. The voice assistant is sometimes used as a vehicle navigation system or the like. Types of the voice assistant include not only those for personal use at home but also those installed at a public space and those for rent.

Each of the voice assistants 121 and 122 has a function of registering and managing identification information of a registered user and voiceprint information based on a voice input by the user in association with each other. This function allows, when an audio signal is input, the voice assistants 121 and 122 to identify a user based on a matching degree with the registered voiceprint. When the user is successfully identified, each of the voice assistants 121 and 122 transmits the audio signal (a request made by voice) and information on the identified user to the response system 131.

The response system 131 is implemented in a server computer. The response system 131 interprets the content of the request based on the audio signal received from each of the voice assistants 121 and 122. The response system 131 creates an appropriate response for the user identified based on the voiceprint, and returns the response to the voice assistant 121 or 122 that has transmitted the request. The response system 131 manages music data accumulated in a storage thereof or a storage service on the network. The response system 131 also holds a learning model (described later) to return an appropriate response.

For example, if the audio signal input to the voice assistant 121 represents "Play music", the response system 131 returns a Uniform Resource Identifier (URI) for accessing music data which the response system 131 has autonomously selected from among the managed music data. The voice assistant 121 then downloads the music data using the URI returned from the response system 131 and plays music based on the music data.

There may be cases where the user makes a voice input, for example, "What's weather like today?" which does not require a recommendation. In such a case, the response system 131 returns information on the today's weather to the voice assistant 121 that has transmitted the request. In accordance with this response, the voice assistant 121 outputs information on the today's weather.

The response system 131 may be implemented by a single server or a single virtual server or may be implemented by a. plurality of servers or a plurality of virtual servers. Part or entirety of the function of the response system 131 may be incorporated into the voice assistants 121 and 122.

Figure 2A:
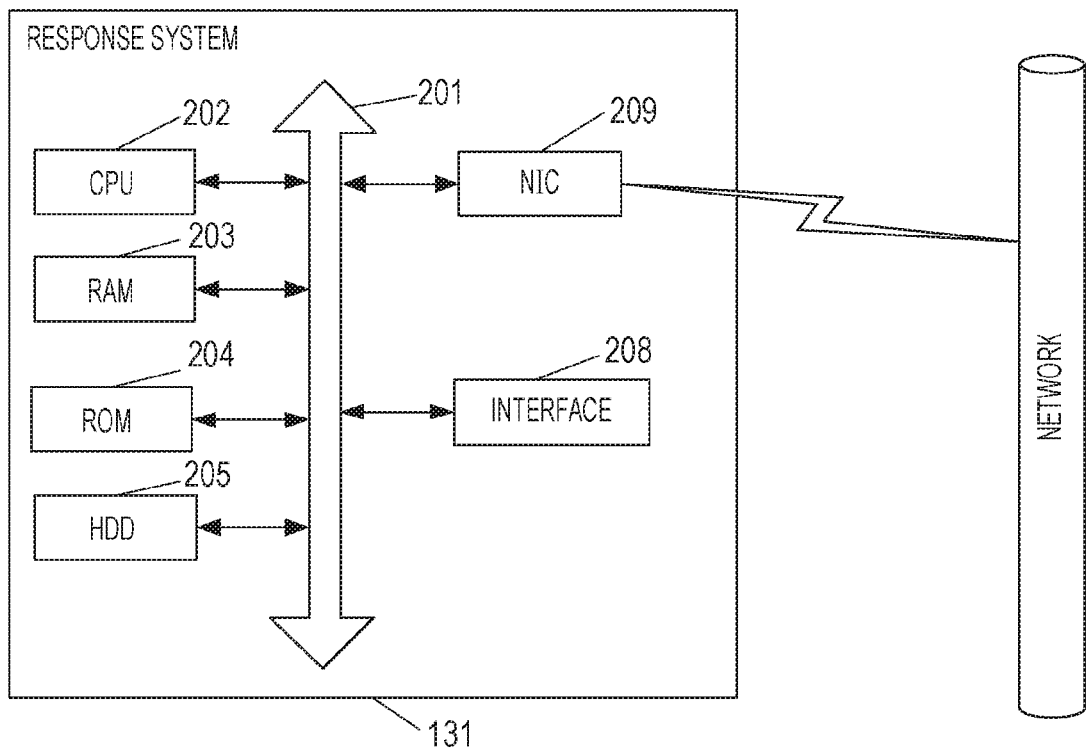
FIG. 2A is a diagram illustrating a hardware configuration of a response system according to the first embodiment.

FIG. 2A is a diagram illustrating a hardware configuration of the response system 131 according to the first embodiment.

Referring to FIG. 2A, a central processing unit (CPU) 202 controls the entire response system 131. The CPU 202 executes programs such as an application program and an operating system (OS) stored in a hard disc drive (HDD) 205, and performs control to temporarily store information, files, or the like used for execution of the programs in a random access memory (RAM) 203. A read-only memory (ROM) 204 is a storage device and stores therein various kinds of data such as a basic input/output (I/O) system. The RAM 203 is a temporary storage device and functions as a main memory and a work area for the CPU 202. The HDD 205 is an example of a storage unit. The storage unit that functions as a mass storage may be implemented by a device other than a hard disk. The storage unit stores programs such as an application program for interpreting an audio signal and returning a response, programs relating to service servers, an OS, and related programs. The application program uses a trained model to create a response, and this model is also stored in the storage unit. An interface 208 is an interface (I/F) to an external device and connects a printer, a Universal Serial Bus (USB) device, a peripheral device, or an input device to the response system 131. A system bus 201 controls a flow of data in the response system 131. A network interface card (NIC) 209 is a component for exchanging data with an external device via the network 102.

Note that the above-described hardware configuration of the response system 131 is merely an example, and the hardware configuration of the response system 131 is not limited to the example illustrated in FIG. 2A. For example, the storage destination of the data and programs may be switched between the ROM 204, the RAM 203, the HDD 205, and the like depending on the characteristics of the data and programs. The CPU 202 executes an application program stored in the HDD 205, and consequently a software configuration and flowcharts illustrated in FIG. 3 and subsequent figures are implemented.

Figure 2B:
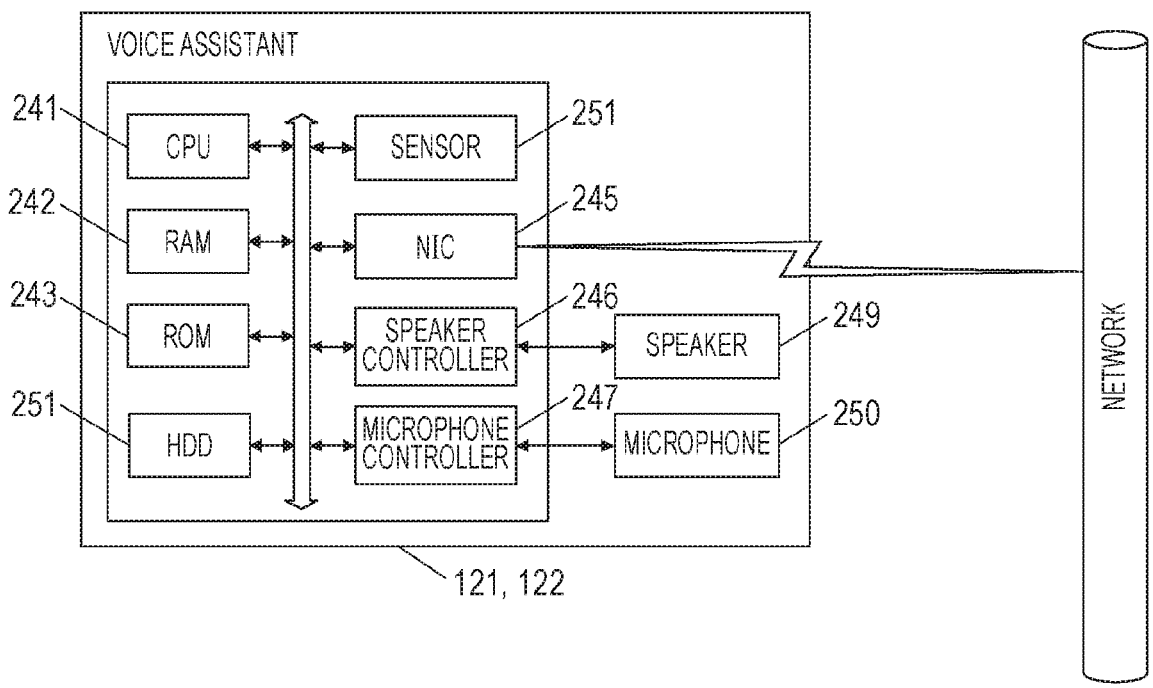
FIG. 2B is a diagram illustrating a hardware configuration of a voice assistant according to the first embodiment.

FIG. 2B is a diagram illustrating a hardware configuration of the voice assistants 121 and 122 according to the first embodiment.

Referring to FIG. 2B, a CPU 241 controls the entire voice assistant 121 or 122. The CPU 241 performs control to temporarily store information, files, or the like used for execution of programs such as an application and the OS in a RAM 242 and to execute the programs. A ROM 243 is a storage device and stores therein various kinds of data such as a basic input/output (I/O) system. The RAM 242 is a temporary storage device and functions as a main memory and a work area for the CPU 241, An HDD 251 is an example of a storage unit that is a mass storage. The HDD 251 stores applications, the OS, related programs, and so on.

A speaker controller 246 controls a speaker 249. A microphone controller 247 controls a microphone 250. A NIC 245 exchanges data with the response system 131 via the networks 102 to 104. A sensor 251 may be a sensor such as an acceleration sensor or a light sensor.

Each of the voice assistants 121 and 122 may include a display illustrated) and may output, as a video image, data obtained from a response returned from the response system 131. In such a case, each of the voice assistants 121 and 122 may output a video image as well as sound from the speaker 249.

Figure 4:
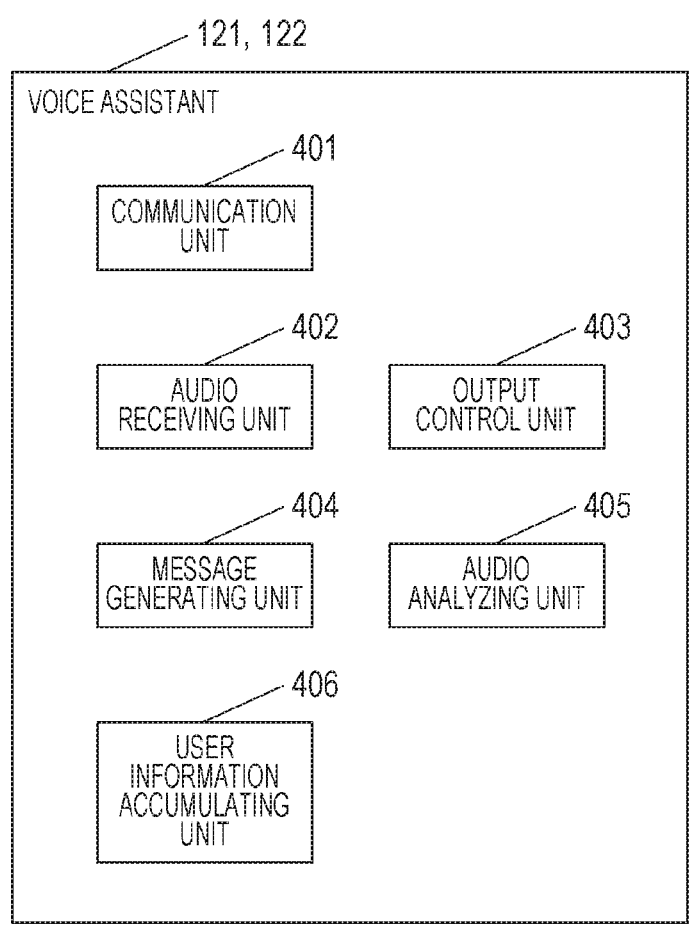
FIG. 4 is a diagram illustrating an example of a software configuration of the voice assistant according to the first embodiment.
Figure 5B:
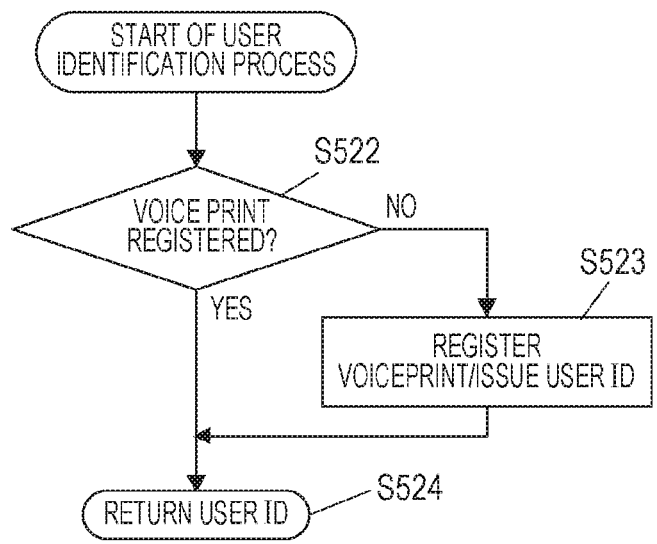
Figure 5C:
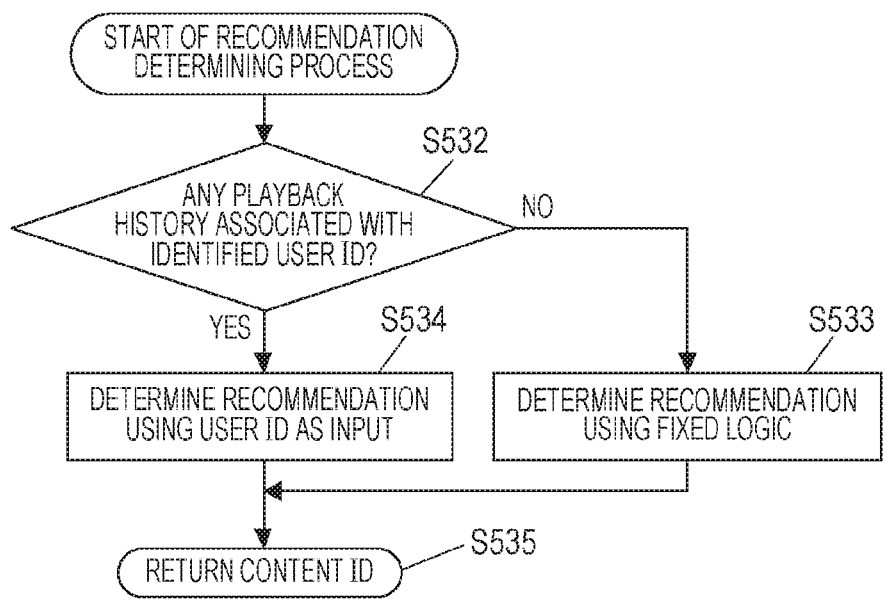

The CPU 241 executes an application, and consequently a software configuration illustrated in FIG. 4 and processes described later in flowcharts of FIGS. 5A, 5B and 5C are implemented.

FIG. 4 is a diagram illustrating an example of a software configuration of each of the voice assistants 121 and 122. A communication unit 401, an audio receiving unit 402, an output control unit 403, a message generating unit 404, an audio analyzing unit 405, and a user information accumulating unit 406 illustrated in FIG. 4 are software-based constituents implemented by the CPU 241 executing a program according to an embodiment of the present invention.

Each of the voice assistants 121 and 122 includes the communication unit 401, the audio receiving unit 402, the output control unit 403, the message generating unit 404, the audio analyzing unit 405, and the user information accumulating unit 406.

The audio receiving unit 402 accepts voice of a user from the microphone 250 and converts the voice into an audio signal. Instead of continuously converting voice into an audio signal all the time, the audio receiving unit 402 may convert voice of the user that immediately follows a specific keyword.

The audio analyzing unit 405 extracts voiceprint from the audio signal obtained through conversion by the audio receiving unit 402. The user information accumulating unit 406 manages a user ID that is identification information of a user and voiceprint of voice of the user in association with each other as illustrated in Table 1.

TABLE 1

| User ID | Voiceprint |
|---------|------------|
| user001 | 101001101101 ... |
| user002 | 010100001111 ... |
| . | . |
| . | . |
| . | . |

The user ID that is identification information of each user is registered in a user ID field. In Table 1, two users are registered. Binary data representing a feature quantity of voiceprint is registered in a voiceprint field in association with the user ID. If voiceprint matching the voiceprint extracted by the audio analyzing unit 405 is not found in Table 1, the corresponding user may be treated as a guest user. Alternatively, a new user ID may be issued for the user, and the user ID may be added to Table 1 along with the voiceprint.

The message generating unit 404 transmits a request including an audio signal to the response system 131 via the communication unit 401 and receives a response to the request. The message generating unit 404 generates a message to be output, on the basis of the received response. The output control unit 403 outputs the message generated by the message generating unit 404 using the speaker 249 or the display (not illustrated).

Figure 6A:
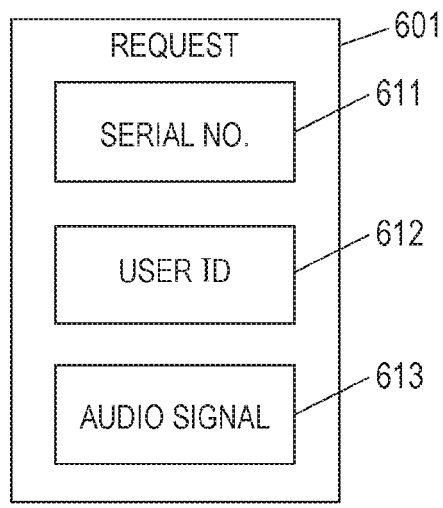
FIGS. 6A and 6B respectively illustrate an example of a request and an example of a response exchanged between the voice assistant and the response system according to the first embodiment.

Referring now to FIG. 6A, a request 601 transmitted by the message generating unit 404 of each of the voice assistants 121 and 122 to the response system 131 will be described.

The request 601 includes a serial number (serial No.) 611, a user ID 612, and an audio signal 613. The serial number 611 is information for uniquely identifying a voice assistant. The serial numbers of the voice assistants 121 and 122 are stored in the respective ROMs 243 thereof. The audio signal 613 is an audio signal obtained through conversion by the audio receiving unit 402 and is information representing the user input (request). The user ID 612 is the user ID identified from Table 1 by using the voiceprint extracted from the audio signal 613.

FIG. 4 is a diagram illustrating an example of a software configuration of each of the voice assistants 121 and 122. The communication unit 401, the audio receiving unit 402, the output control unit 403. the message generating unit 404, the audio analyzing unit 405, and the user information accumulating unit 406 illustrated in FIG. 4 are software-based constituents implemented by the CPU 241 executing a program according to an embodiment of the present invention.

Figure 3:
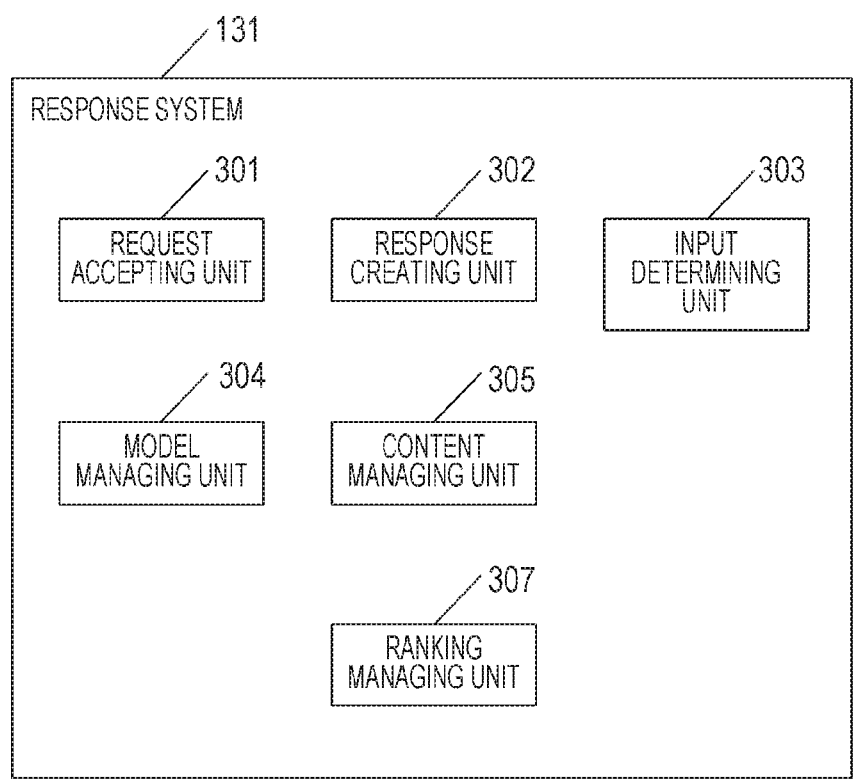
FIG. 3 is a diagram illustrating an example of a software configuration of the response system according to the first embodiment.

FIG. 3 is a diagram illustrating an example of a software configuration of the response system 131. A request accepting unit 301, a response creating unit 302, an input determining unit 303, a model managing unit 304, a content managing unit 305, and a ranking managing unit 307 illustrated in FIG. 3 are software-based constituents implemented by the CPU 202 executing a program according to an embodiment of the present invention.

The response system 131 includes the request accepting unit 301, the response creating unit 302, the input determining unit 303, the model managing unit 304, the content managing unit 305, and the ranking managing unit 307.

The request accepting unit 301 receives the request 601 from each of the voice assistants 121 and 122 via the network. The response creating unit 302 creates a response to the request 601 and returns the response to the message generating unit 404 of the corresponding one of the voice assistants 121 and 122.

The input determining unit 303 analyzes the audio signal 613 included in the request 601 to extract an input parameter. In this example, the parameter is extracted on the basis of a feature quantity extracted by an acoustic model and words or sentences identified using a corpus or the like.

The response creating unit 302 has a function of creating responses to various requests of the user, such as "What's the weather like today?" and "What does XX mean?" In this embodiment, description is given of an example case where a request including an audio signal representing "Play recommended music" is accepted.

The content managing unit 305 manages pieces of content such as music data to be provided to the user via the voice assistants 121 and 122. Table 2 presents an example of a content list managed by the content managing unit 305.

TABLE 2

| Content ID | Title | Artist Name | Genre | Content URI |
|---|---|---|---|---|
| 001 | Tune A | AAA | J-POP | music.xxx.com/wea901adfa |
| 002 | Tune B | AAA | J-POP | music.xxx.com/asdfau98ej0raw |
| 003 | Tune C | BBB | Rock | music.xxx.com/dasfseurq43r |
| . | . | | | . |
| . | . | | | . |
| . | . | | | . |

A content ID field indicates identification information (ID) for uniquely identifying a piece of content managed by the content managing unit 305. A title field indicates a title of the piece of content. An artist field indicates an artist name of the piece of content, which is an attribute of the piece of content. A genre field indicates a category (genre) of the piece of content, which is an attribute of the piece of content. A content URI field indicates a location to access the piece of content. Music data or the like can be played by downloading the piece of content from the location indicated by this URI.

The model managing unit 304 manages a trained model for recommending music suitable for a request of the user. The model managing unit 304 receives, as inputs, the user ID 612 included in the request 601 and the parameter extracted by the input determining unit 303, and obtains, using the trained model, an output (estimation) result indicating a recommended piece of content suitable for the user indicated by the user ID 612. The obtained output result is supplied to the response creating unit 302. Table 3 presents an example of information managed by the model managing unit 304.

TABLE 3

| Ser. No. | User ID | 001 | 002 | 003 | 004 | 005 | ... |
|---|---|---|---|---|---|---|---|
| ABC012 | user001 | 5 | 0 | 1 | 0 | 3 | ... |
| ABC012 | user002 | 0 | 0 | 0 | 0 | 0 | ... |
| CCC139 | user003 | 15 | 0 | 0 | 3 | 9 | ... |
| . | . | . | . | . | . | . | . |
| . | . | . | . | . | . | . | . |
| . | . | . | . | . | . | . | . |

A serial number (No.) field indicates the number for uniquely identifying a voice assistant. A user ID field indicates the user ID. Fields such as a 001 field, a 002 field, ..., a 00N field are prepared for the respective content IDs, and each store the number of times the corresponding piece of content identified by the content ID has been played. For example, these fields store history information indicating that the user identified by the user ID "user001" has played the piece of content indicated by the content ID "001" five times using the voice assistant having the serial number "ABC012". As a result of learning based on these content playback histories of the respective users, the model managing unit 304 obtains an output of a recommendation result of a piece of content optimum for the request 601 using collaborative filtering. Specifically, the model managing unit 304 vectorizes the data of each field of Table 3 and calculates similarities between a vector for the user who has made the request and vectors for the other users. For example, the model managing unit 304 obtains, as a content list matching the preference of the user, tunes which the most similar user (having the highest similarity) has played. As the method for determining the similarities, a method based on cosine similarities or simple Mahalanobis distances between the vectors may be conceived.

In the example of Table 3, when the user assigned the user ID) "user001" makes a request "Play recommended music", a piece of content indicated by the content ID "004" may be obtained as a recommended output in consideration of the content playback tendency of the user assigned the user ID "user001" and the similarities.

The ranking managing unit 307 manages a ranking of the numbers of times the respective pieces of content managed by the content managing unit 305 have been played.

Figure 6B:
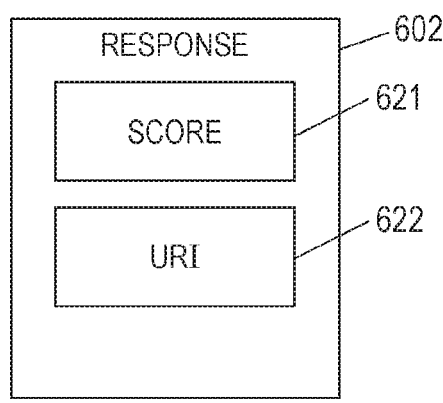

The information managed by the model managing unit 304 is only the numbers of times the respective pieces of content managed by the content managing unit 305 have been played in the above-described example. However, any item regarding the preference of the individual such as the numbers of times the respective pieces of content have been skipped during playback may be added. To increase the accuracy of recommendation achieved by collaborative filtering, information not relating to the pieces of content managed by the content managing unit 305, for example, purchase histories at e-commerce (EC) sites and viewing histories at moving image sites may also be managed by the model managing unit 304. The information managed by the model managing unit 304 is in a data structure that assumes the use of collaborative filtering as the recommendation technique. However, this is not the case when the piece of content is recommended using another technique. FIG. 6B illustrates a response 602 created by the response creating unit 302 on the basis of the recommendation result obtained by the model managing unit 304. The response 602 is transmitted to the voice assistant via the NIC 209. In the voice assistant, the response 602 is returned to the message generating unit 404 via the communication unit 401.

A URI 622 included in the response 602 is a URI indicating a content access destination corresponding to the recommendation obtained by the model managing unit 304. A score 621 included in the response 602 is a score indicating the degree of matching between the piece of content represented by the URI 622 and the preference of the user identified by the user ID 612. A higher score indicates that music matches the preference of the user more. As the method for calculating the score 621, a method for calculating the score 621 on the basis of the number of times of playback or an elapsed time from the last playback time, for example, is conceivable.

The response 602 may include a plurality of sets of the score 621 and the URI 622. This allows the message generating unit 404 of the voice assistant to sequentially output pieces of content in descending order of the score.

FIGS. 5A, 5B, and 5C, are flowcharts describing a process performed when a user inputs a request for a recommended piece of content to the voice assistant 121 or 122.

In S501, the audio receiving unit 402 receives, for example, voice "Play recommended music" via the microphone 250, converts the voice into an audio signal, and sends the resultant audio signal to the message generating unit 404. In S502, the message generating unit 404 performs a user identification process (FIG. 5B).

FIG. 5B is a flowchart describing a process of identifying a user who has input the accepted voice.

In S522, the message generating unit 404 causes the audio analyzing unit 405 to analyze the audio signal to extract voiceprint, and to determine whether the extracted voiceprint is registered in Table 1 managed in the user information accumulating unit 406. If the audio analyzing unit 405 determines that the voiceprint is registered, the audio analyzing unit 405 identifies the user ID managed in association with the voiceprint. If the audio analyzing unit 405 determines that the voiceprint is not registered, the audio analyzing unit 405 newly registers the voiceprint in Table 1 managed in the user information accumulating unit 406 and issues the corresponding user ID in S523. The audio analyzing unit 405 identifies the user ID issued at this time as the user ID corresponding to the newly registered voiceprint.

In S524, the audio analyzing unit 405 returns the identified user ID to the message generating unit 404.

Referring back to FIG. 5A, in S503, the message generating unit 404 transmits the request 601 to the response system 131 via the communication unit 401. The request 601 includes the user ID identified in S502 as the user 612.

In S511, the response creating unit 302 receives the request 601 via the request accepting. unit 301. The response creating unit 302 transfers the audio signal 613 to the input determining unit 303. The input determining unit 303 determines whether the audio signal 613 represents a request for a recommended piece of content. If the input determining unit 303 determines that the audio signal 613 represents a request for a recommended piece of content such as "Play recommended music" mentioned above, the process proceeds to S513. If the input determining unit 303 determines that the audio signal 613 does not represent a request for a recommended piece of content, the response creating unit 404 performs processing corresponding to the content of the request in S512. Description of details of this processing is omitted in the first embodiment.

FIG. 5C describes the details of S513, and is a flowchart describing a process of determining a piece of content recommended to the user.

In S532, the model managing unit 304 determines whether the serial number 611 included in the request 601 and the user identified by the user ID 612 included in the request 601 are registered in Table 3. That is, the model managing unit 304 determines whether Table 3 includes a content playback history of the identified user. If Table 3 does not include the content playback history of the identified user, the process proceeds to S533. if Table 3 includes the content playback history of the identified user, the process proceeds to S534.

In S533, the ranking managing unit 307 determines the content ID of the piece of top content in the numbers of times of playback as a recommendation. In this example, a list including content IDs of a plurality of pieces of top content may be determined as recommendations.

In S534, the model managing unit 304 determines the content ID of the recommended piece of content or a list including content IDs of a plurality of recommended pieces of content using the aforementioned collaborative filtering or the like.

In S535, the model managing unit 304 or the ranking managing unit 307 returns, to the response creating unit 302, the content ID of the determined recommended piece of content or the list of the content IDs of the plurality of recommended pieces of content.

Referring back to FIG. 5A, in S514, the response creating unit 302 identifies, from Table 2, a URI for downloading the recommended piece of content identified by the content ID or the plurality of recommended pieces of content identified by the list of the content IDs. The response 602 including this URI is transmitted to the voice assistant. The response 602 may include audio information for playing an attribute such as a title of the piece of content from the speaker 249 of the voice assistant. The attribute information is identified from Table 2.

In S541, the message generating unit 404 of the voice assistant receives the response 602, and downloads the piece of content on the basis of the URI included in the response 602. In S542, the output control unit 403 outputs music data that is the downloaded piece of content via the speaker 249. The process then ends.

The first embodiment allows a device used by many unspecified users such as the voice assistant 121 or 122 to identify, using the voiceprint, the user who has requested a piece of content and to present a recommendation.

In addition, in the first embodiment, authentication of individuals is not required and it is sufficient to distinguish between different users from one another. Thus, as a secondary effect, all the family members can receive a benefit even when the family includes a child for whom user registration is not desired or an elderly person with a poor IT literacy. In the case where the user registration is performed, registration involving association of the user ID and the voiceprint is not necessarily required. Therefore, the user can easily start using the service.

Second Embodiment

There may be cases where the same user expects different recommended pieces of content depending on the circumstances. Examples of the circumstances in this case may include, for example, the cases where the user is in a quiet environment (the user is alone) and where the user is in an environment in which the user can hear voices of a plurality of people, the cases where the user is at home and where the user is traveling on the road (is driving a car), and the cases where the user is in a bright environment and the user is in a dark environment. In the first embodiment, when the voiceprint matches the registered voiceprint, the same or similar recommendation is presented. irrespective of the circumstances.

In the second embodiment, the model represented by Table 3 described in the first embodiment is separately provided for different circumstances. In the second embodiment, it is assumed that a. sufficient amount of history is stored for each circumstance. The model managing unit 304 manages the separate models for different circumstances.

The second embodiment will be described in detail below Description of the configuration that is common to the first embodiment is omitted.

Figure 7:
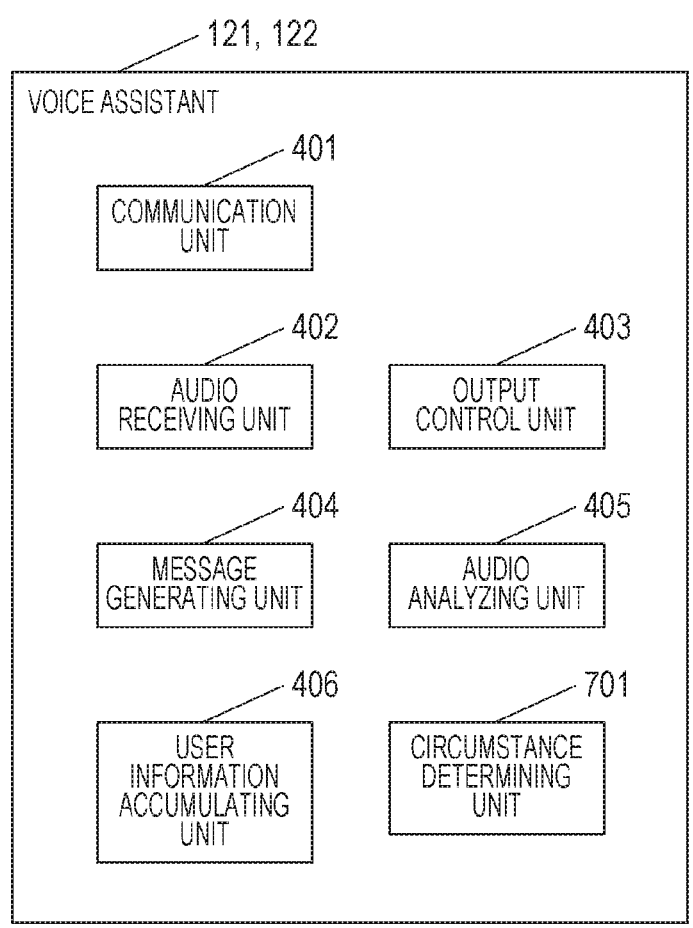
FIG. 7 is a diagram illustrating an example of a software configuration of a voice assistant according to a second embodiment.

FIG. 7 illustrate a software configuration of each of the voice assistants 121 and 122 according to the second embodiment. In FIG. 7, a circumstance determining unit 701 is added to the software configuration illustrated in FIG. 4 according to the first embodiment.

The circumstance determining unit 701 determines a circumstance which the user is in by using information obtained from the sensor 251 or the audio signal obtained through conversion by the audio receiving unit 402. Each of the voice assistants 121 and 122 may include a plurality of different sensors 251.

For example, if the sensor 251 has a Global Positioning System (GPS) function, the circumstance determining unit 701 can determine whether the user is at home, is traveling on a vehicle, or the like from the location information. If the sensor 251 has a function of determining the brightness around the user from an amount of light, the circumstance determining unit 701 can determine whether the user is in a bright environment or a dark environment. The audio receiving unit 402 analyzes the audio signal obtained through conversion and determines whether pieces of voiceprint of a plurality of people are detected. This allows the circumstance determining unit 701 to determine whether the user is alone or is with someone else. In this manner, the circumstance determining unit 701 can determine a circumstance around the user and/or the voice assistant at a timing at which input of a voice instruction is accepted from the user.

Table 4 presents an example of information managed in the user information accumulating unit 406 in the second embodiment.

TABLE 4

| User ID | Voiceprint | (Circumstance) Home/Driving | (Circumstance) Alone/Multiple People |
|---|---|---|---|
| user001-1 | 101001101101 | Home | Alone |
| user001-2 | 101001101101 | Driving | Alone |
| user001-3 | 101001101101 | Home | Multiple People |
| user001-4 | 101001101101 | Driving | Multiple People |
| user002-1 | 010100001111 | Home | Alone |
| . | . | . | . |
| . | . | . | . |
| . | . | . | . |

A user ID field and a voiceprint field indicate information that is the same or substantially the same as the information of the first embodiment. A home/driving field and an alone/multiple people field indicate the circumstance determined by the circumstance determining unit 701.

In Table 4, different user IDs are assigned to the user having the same voiceprint depending on the circumstance. As for the circumstances, the cases where the user is in a bright environment and is in a dark environment and other cases may also be managed.

Table 5 presents an example of information managed by the model managing unit 304 in the second embodiment.

TABLE 5

| Ser. No. | User ID | 001 | 002 | 003 | 004 | 005 | ... |
|---|---|---|---|---|---|---|---|
| ABC012 | user001-1 | 2 | 0 | 0 | 0 | 1 | ... |
| ABC012 | user001-2 | 1 | 0 | 1 | 0 | 0 | ... |
| ABC012 | user001-3 | 1 | 0 | 0 | 0 | 0 | ... |
| ABC012 | user001-4 | 1 | 0 | 0 | 0 | 0 | ... |
| ABC012 | user002-1 | 0 | 0 | 0 | 0 | 0 | ... |
| . | . | . | . | . | . | . | . |
| . | . | . | . | . | . | . | . |
| . | . | . | . | . | . | . | . |

A definition of each field is the same or substantially the same as that of Table 3 of the first embodiment. However, the user ID field stores the user ID stored in Table 4. Specifically, values stored in the 001 field, 002 field, and so on indicated by the respective content IDs associated with the user identified by "ABC012" in the serial number field and by "user001-1" in the user ID field indicate histories regarding the numbers of times the pieces of content indicated by the respective content IDs have been played when the user is alone at home.

Figure 8:
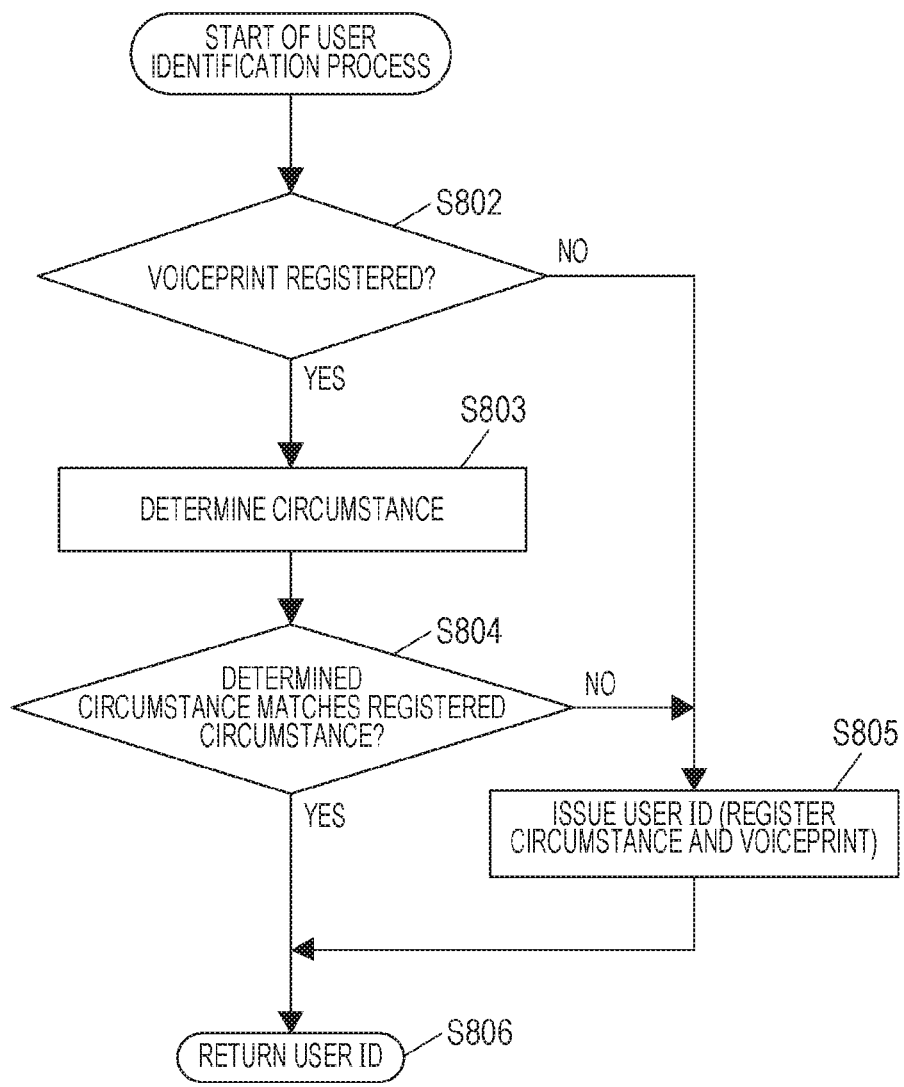
FIG. 8 is a flowchart describing a process specific to the second embodiment.

FIG. 8 illustrates a user identification process performed by the voice assistant in the second embodiment and is extension of FIG. 5B of the first embodiment.

In S802, the message generating unit 404 causes the audio analyzing unit 405 to analyze the audio signal to extract voiceprint, and to determine whether the extracted voiceprint is registered in Table 4 managed in the user information accumulating unit 406. If it is determined that the voiceprint is registered, the process proceeds to S803. If it is determined that the voiceprint is not registered, the process proceeds to S805.

In S803, the circumstance determining unit 701 determines a circumstance around the user on the basis of the analysis result obtained by the audio analyzing unit 405 and detection information provided by the sensor 251. In S804, the circumstance determining unit 701 determines whether a combination of the extracted voiceprint and the determined circumstance is registered in Table 4. If the combination is registered, the user ID registered in association with the combination is identified. If the combination is not registered, the process proceeds to S805.

In S805, the audio analyzing unit 405 issues a new user ID. The audio analyzing unit 405 then registers, as a new record, the user ID, the voiceprint, and the circumstance determined in S803 in Table 4 managed in the user information accumulating unit 406. In this case, the issued user ID is identified as the ID corresponding to the voiceprint extracted from the input audio signal.

In S806, the audio analyzing unit 405 returns the identified user ID to the message generating unit 404.

The following processing is the same or substantially the same as that of the first embodiment. Specifically, the request 601 transmitted by the message generating unit 404 to the response system 131 in S503 includes the user ID identified in FIG. 8 as the user ID 612. The user ID identified in this case is identification information assigned in consideration of the circumstance of the user when the user gives a voice instruction.

The second embodiment allows a recommendation according to the circumstance in which the user is using the voice assistant to be presented.

(Modifications)

In FIG. 8, the user ID is issued and registered in consideration of the circumstance in which the user is using the voice assistant. The circumstance in which the user is using the voice assistant may be managed by the response system 131.

In such a case, the user information accumulating unit 406 may manage the information in a manner as illustrated in Table 1. The request 601 transmitted by the message generating unit 404 to the response system 131 includes information for identifying the circumstance determined by the circumstance determining unit 701 in addition to the user ID identified in FIG. 5B.

The model managing unit 304 of the response system 131 manages the numbers of times pieces of content have been played in each record in association with the circumstance in Table 4 as well as the serial number and the user ID in Table 3.

The model managing unit 304 switches between logics used for determining a recommendation depending on whether a sufficient amount of playback histories are stored in association with the user ID and the circumstance when the request 601 is received.

Specifically, if there is no playback history associated with the user ID, the same or substantially the same processing as that of S533 is performed. If there is a playback history associated with the user ID but the amount of playback history for the circumstance is less than a predetermined threshold, the recommendation is determined using all the playback histories associated with the user ID irrespective of the circumstance as in the first embodiment. If the amount of playback history associated with the user ID and the circumstance is more than the predetermined threshold, the recommendation is determined only from the playback history associated with the user ID and the circumstance.

Third Embodiment

Since the tendency of the number of times of playback does not change drastically, the same response 602 may be generated every time through the process illustrated in FIG. 5C in the first and second embodiments. Consequently, the user may continuously receive a less-surprising recommendation.

In the third embodiment, a mechanism is provided in which the response 602 is changed in accordance with a trigger condition, so that the user does not get tired of the recommendation of the response system 131 and is provided with some kind of inspiring opportunity. The third embodiment is an improvement of the first and second embodiments. Thus, a difference from the first and second embodiments described above is described in detail, Table 6 presents an example of information managed by the model managing unit 304 of the response system 131 according to the third embodiment.

TABLE 6

| Ser. No. | User ID | 001 | 002 | 003 | ... | movie1 | movie2 | ... |
|---|---|---|---|---|---|---|---|---|
| ABC012 | user001 | 5 | 0 | 1 | ... | 1 | 10 | ... |
| ABC012 | user002 | 0 | 0 | 0 | ... | 1 | 0 | ... |
| CCC139 | user003 | 15 | 0 | 0 | ... | 1 | 1 | ... |
| . | . | . | . | . | | . | . | |
| . | . | . | . | . | | . | . | |
| . | . | . | . | . | | . | . | |

Definitions of a serial number field, a user ID field, a 001 field, a 002 field, and so on are the same or substantially the same as definitions of the respective fields of Table 3 in the first embodiment. A movie1 field, a movie2 field, and so on indicate the numbers of times the user identified by the serial number field and the user ID field has played moving images corresponding to the movie 1, the movie 2, and so on. For example, it is indicated that the user identified by the serial number "ABC012" and the user ID "user001" have played the moving images identified by the movie1 and the movie2 once and ten times, respectively. Pieces of moving image content identified by the movie1 and the movie2 are moving images stored in the content managing unit 305 and managed by the content managing unit 305. Since the method for managing the pieces of moving image content corresponding to the movie1, the movie2, and so on employed by the content managing unit 305 is the same or substantially the same as that of the first embodiment, description thereof is omitted.

In the third embodiment, the numbers of times music indicated by the 001 field, the 002 field, and so on in Table 6 have been played and the numbers of times moving images indicated by the movie1 field, the movie2 field, and so on have been played are collectively referred to as "user attributes" of the user identified by the serial number field and the user ID field. The recommendation result is changed by changing the user attributes in Table 6 on the basis of a certain trigger.

Note that changing the user attributes does not mean changing the values in Table 6 managed by the model managing unit 304. Changing the user attributes means changing a parameter used for identifying a similar user in processing of collaborative filtering described in S534 in the first embodiment.

A trigger for changing the user attributes in Table 6 and a method for changing the user attributes will be described below. The trigger for changing the user attributes in Table 6 and the method for changing the user attributes are not limited to examples described in the third embodiment.

An example of the trigger for changing the user attributes in Table 6 will be described first. As the trigger for changing the user attributes, an input from the user or a change in the circumstance determined by the circumstance determining unit 701 is conceivable.

As an example case of changing the user attributes in Table 6 in accordance with an input from the user, the case where a voice input such as "I want to change my mood" or "Play a type of music different from usual" is input from the user is conceivable. As an example case of changing the user attributes in response to a change in the circumstance determined by the circumstance determining unit 701. the case where it suddenly becomes dark around the user, that is, the lighting is turned off is conceivable. In addition, the case where the circumstance determining unit 701 determines the same circumstance a predetermined number of times in row in response to receipt of a voice instruction indicating a user request for playback of a piece of content or the case where an occurrence frequency of a specific circumstance is high among a plurality of voice instructions is also conceivable.

As the trigger, a trigger that takes into consideration the weather, temperature, humidity, and the like of the day may also be used. In addition, even when the user performs an input such as "Play music" as usual, whether or not a certain time period has passed from the previous input or a change in frequency with which the user talks to the voice assistant 121 or 122 may be used as the trigger.

The user attributes in Table 6 may be changed at a completely rand©m timing or regularly without a specific trigger.

The method for changing the parameter (the user attributes of the user who has given the voice instruction) used for identifying the similar user in processing of collaborative filtering in the third embodiment will be described next.

As the method for changing the user attributes in Table 6, it is conceivable to delete the number of times of playback for the attributes corresponding to the movie1 field, the movie2 field, and so on. Consequently, music which another user who has the music preference similar to the user usually listens to is set as a target to be recommended irrespective of the preference for the moving images. Thus, different music is recommended from the case where music is recommended based on another user having the moving image preference and the music preference that are both similar to those of the user.

When the user attributes are entirely deleted, music which the user listens to completely randomly may be recommended. In the third embodiment, one or some of specific attributes or a randomly selected attribute alone is deleted from the parameters, so that the feature of the user is made ambiguous and an unexpected piece of content that is different from the user's preference to some extent is recommended.

As another method for changing the user attributes in Table 6, a method of using the user attributes of another user as the parameters is also conceivable. For example, there is conceived a method of calculating similarities between the vector of the user attributes of the user and the vectors of the user attributes of the other users and of replacing the user attributes of the user with the user attributes of another user having the similarity that is less than or equal to a threshold. By limiting other users whose user attributes replace the user attributes of the user to the users whose similarity of the vector of the user attributes is less than or equal to the threshold, a situation in which a piece of content that deviates from the user's preference too much is recommended can be avoided. Consequently, a recommendation result offered if the user were another user similar to the user is obtained, and an unexpected recommendation result can be obtained.

There is also conceived a method of setting the number of times of playback to 0 for music associated with the genre "Rock" in Table 2, so that music associated with the genre "Rock" is less likely to be recommended.

The model managing unit 304 manages the trigger for changing the user attributes, the method for changing the user attributes, and rules for mapping these. Specifically, different methods for changing the user attributes may be used for different triggers described above.

For example, rules such as "deleting the user attributes of the movie1 field, the movie2 field, and so on in response to an input indicating the user wants to change his/her mood" and "setting the number of times of playback to 0 for music associated with the genre "Rock" in Table 2 when the lighting becomes dark" are conceivable.

The response creating unit 302 receives the recommendation result from the model managing unit 304 that follows the trigger for changing the user attributes in S534, and generates the response 602. The other processes are the same or substantially the same as those of the embodiments described above.

Fourth Embodiment

Since the voice assistants 121 and 122 may be used by many unspecified people, a plurality of users who are not associated with the account may be added from the middle. No data is accumulated for these newly added users in the model managing unit 304. Thus, it is difficult to present recommendations desired by these users.

Accordingly, in the fourth embodiment, the voice assistants 121 and 122 each prompt a new user to make an input that characterizes the user, that is, an input that allows for determination of the user's preference.

Since the fourth embodiment has many configurations that are common to the first embodiment, a difference will be described.

Figure 9:
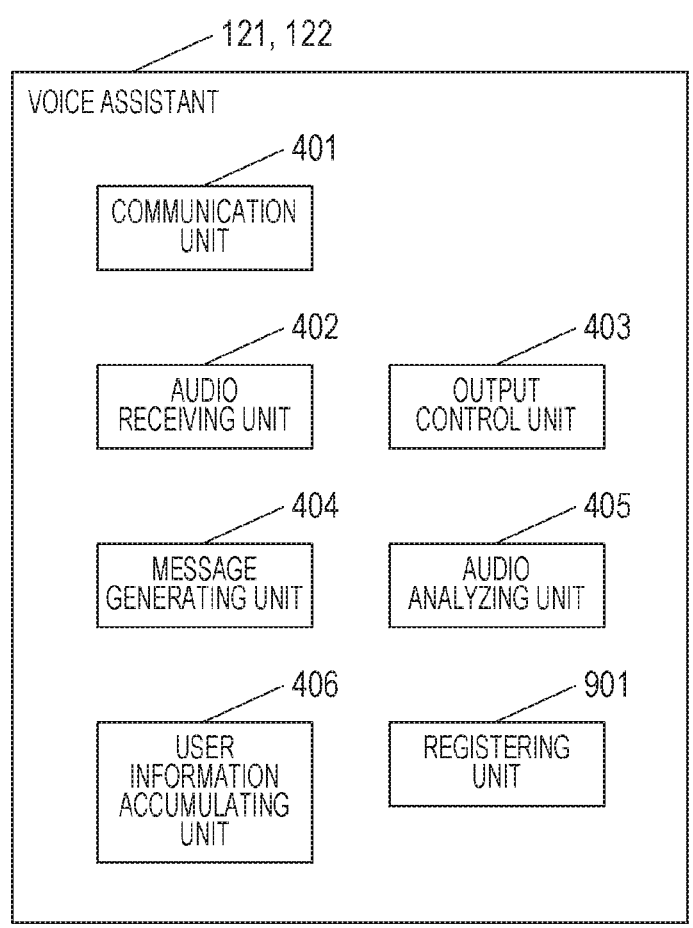
FIG. 9 is a diagram illustrating an example of a software configuration of a voice assistant according to a fourth embodiment.

FIG. 9 illustrates a software configuration of each of the voice assistants 121 and 122 according to the fourth embodiment. A registering unit 901 presents a question to the user via the output control unit 403 if the voiceprint does not match the past input in S522 of the first embodiment and obtains an answer to the question via the audio receiving unit 402.

The registering unit 901 obtains music from the content managing unit 305 via the request accepting unit 301, and plays the obtained music via the output control unit 403 to prompt the user to determine whether the user "likes, does not like, or does not know" the music. The registering unit 901 obtains the user's determination result from the audio receiving unit 402 and increments the number of times of playback for the piece of content which the user likes in Table 3 of the first embodiment. The other processes are the same or substantially the same as those of the embodiments described above.

Other Embodiments

It should be noted that an apparatus or system and a method for the same that are configured by appropriately combining the embodiments described above are also encompassed by the present invention.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors e.g., central processing unit (CPU), micro processing unit (MPU)) and may include a network of separate computers or separate processors to read out and execute the computer executable instructions, The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-140813, filed Jul. 31, 2019, which is hereby incorporated by reference herein in its entirety.

What is claimed is:
1. An information processing system comprising:
an audio processing device and a response system is configured to manage information about a plurality of pieces of content and manage, for each user, playback history information about the plurality of pieces of content in association with identification information of a user,
wherein the audio processing device includes:
a microphone for accepting an input of voice;
at least one memory storing instructions, and
at least one processor executing the instructions causing the audio processing device to:
extract a feature quantity from the accepted input including voice to specify identification information of a user corresponding to the extracted feature quantity, and
transmit a request for a piece of content to the response system; and
wherein the response system,
obtains, when a predetermined trigger is given for the response system, a changed feature that is at least partially changed from a feature of the user based on the playback history information managed by the response system as the user attributes in association with the identification information specified by the extracted feature quantity,
determines, when the request is received from the audio processing device and according to the predetermined trigger, a piece of content to be provided to the user identified by the identification information, using another playback history information having a feature that is similar to the changed feature, and transmits a response including information on the determined piece of content to the audio processing device, wherein the instructions further cause the audio processing device to output the piece of content, based on the information on the piece of content included in the response received from the response system, wherein, when the predetermined trigger is not given for the response system, a piece of content to be provided to the user is determined by using the playback history information managed by the response system in association with the identification information specified by the extracted feature quantity, without using the changed feature, and wherein the predetermined trigger is based on a circumstance determined via the audio processing device when the audio processing device accepts the input.

2. The information processing system according to claim 1, wherein when no playback history is stored in association with the identification information specified by the extracted feature quantity, the response system determines a piece of content to be provided to the user identified by the identification information, using a ranking of the numbers of times the plurality of pieces of content have been played.

3. The information processing system according to claim 1, wherein the audio processing device further includes a sensor, and wherein the instructions further cause the audio processing device to perform a circumstance determination for determining the circumstance, based on information obtained from the sensor when the audio processing device accepts the input, and wherein the circumstance determined by the circumstance determination is used as the predetermined trigger.

4. The information processing system according to claim 3, wherein the identification information of the user is specified based on the circumstance determined by the circumstance determination in addition to the extracted feature quantity, and wherein the response system determines a piece of content according to the circumstance determined by the circumstance determination, using the identification information specified based on the extracted feature quantity and the circumstance determined by the circumstance determination.

5. The information processing system according to claim 3, wherein the response system manages, for a user, playback history information about the plurality of pieces of content in association with information indicating a circumstance in addition to identification information of the user, the audio processing device transmits a request for a piece of content to the response system, the request including information indicating the circumstance determined by the circumstance determination, and the response system determines a piece of content to be provided to the user identified by the identification information specified by the extracted feature quantity, using another playback history information having a feature that is similar to a feature obtained playback history information managed in association with both the identification information and the information indicating the circumstance that are included in the request.

6. The information processing system according to claim 1, wherein the information on the piece of content included in the response transmitted from the response system includes information used for downloading the piece of content.

7. The information processing system according to claim 1, wherein the audio processing device is any of a smart speaker, a smart display, a tablet, a smartphone, a drone, a robot, and an image processing device.

8. A method for an information processing system including an audio processing device and a response system managing information about a plurality of pieces of content and managing, for each user, playback history information about the plurality of pieces of content in association with identification information of a user, the method comprising:

accepting an input of voice;

extracting a feature quantity from the accepted input by the microphone to specify identification information of a user corresponding to the extracted feature quantity;

receiving a request for a piece of content by the response system;

obtaining, when a predetermined trigger is given for the response system, a changed feature that are at least partially changed from a feature of the user based on the playback history information managed by the response system as the user attributes in association with the identification information specified by the extracted feature quantity, determining a piece of content to be provided to the user identified by the identification information, using another playback history information having a feature that is similar to the changed feature;

performing a response including information on the determined piece of content; and outputting, by the audio processing device, the piece of content, based on the information on the piece of content included in the response, wherein, when the predetermined trigger is not given for the response system, a piece of content to be provided to the user is determined by using the playback history information managed by the response system in association with the identification information specified by the extracted feature quantity, without using the changed feature, and wherein the predetermined trigger is based on a circumstance determined via the audio processing device when the audio processing device accepts the input.

9. A non-transitory computer-readable storage medium storing a program related to a method for an information processing system including an audio processing device and a response system is configured to manage information about a plurality of pieces of content and manage, for each user, playback history information about the plurality of pieces of content in association with identification information of a user, the method comprising:

accepting an input of voice;

receiving a request for a piece of content by the response system;

obtaining, when a predetermined trigger is given for the response system, a changed feature that is at least partially changed from a feature of the user based on the playback history information managed by the response system as the user attributes in association with the identification information specified by the extracted feature quantity;

determining a piece of content to be provided to the user identified by the identification information, using another playback history information having a feature that is similar to the changed feature, wherein the feature quantity is extracted from the accepted input by the microphone to specify identification information of a user; and performing a response including information on the determined piece of content, wherein, in the audio processing device, the piece of content is output based on the information on the piece of content included in the response, wherein, when the predetermined trigger is not given for the response system, a piece of content to be provided to the user is determined by using the playback history information managed by the response system in association with the identification information specified by the extracted feature quantity, without using the changed feature, and wherein the predetermined trigger is based on a circumstance determined via the audio processing device when the audio processing device accepts the input.

10. A response system comprising:

one or more memories; and one or more processors that execute a set of instructions to:

manage information about a plurality of pieces of content;

manage, for each user, playback history information about the plurality of pieces of content in association with identification information of a user;

obtain, when a predetermined trigger is given for the response system, a changed feature that is at least partially changed from a feature of the user based on the playback history information managed by the response system as the user attributes in association with the identification information specified by the extracted feature quantity;

determine, when the request is received from the audio processing device and according to the predetermined trigger, a piece of content to be provided to the user identified by the identification information, using another playback history information having a feature that is similar to the changed feature; and transmit a response including information on the determined piece of content to the audio processing device, wherein, when the predetermined trigger is not given for the response system, a piece of content to be provided to the user is determined by using the playback history information managed by the response system in association with the identification information specified by the extracted feature quantity, without using the changed feature, and wherein the predetermined trigger is based on a circumstance determined via the audio processing device when the audio processing device accepts the input.

11. A method for a response system comprising:

manage information about a plurality of pieces of content;

manage, for each user, playback history information about the plurality of pieces of content in association with identification information of a user;

obtaining, when a predetermined trigger is given for the response system, a changed feature that is at least partially changed from a feature of the user based on the playback history information managed by the response system as the user attributes in association with the identification information specified by the extracted feature quantity;

determining, when the request is received from the audio processing device and according to the predetermined trigger, a piece of content to be provided to the user identified by the identification information, using another playback history information having a feature that is similar to the changed feature; and transmitting a response including information on the determined piece of content to the audio processing device, wherein, when the predetermined trigger is not given for the response system, a piece of content to be provided to the user is determined by using the playback history information managed by the response system in association with the identification information specified by the extracted feature quantity, without using the changed feature, and wherein the predetermined trigger is based on a circumstance determined via the audio processing device when the audio processing device accepts the input.

\* \* \* \* \*